(12) United States Patent
Lesonen

(10) Patent No.: US 9,110,551 B2
(45) Date of Patent: Aug. 18, 2015

(54) CAPACITIVE SENSOR ELECTRODES

(71) Applicant: Nokia Corporation, Espoo (FI)

(72) Inventor: Janne Edvin Lesonen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 120 days.

(21) Appl. No.: 13/891,276

(22) Filed: May 10, 2013

(65) Prior Publication Data

US 2014/0333570 A1 Nov. 13, 2014

(51) Int. Cl.
*G06F 3/044* (2006.01)

(52) U.S. Cl.
CPC ..................................... *G06F 3/044* (2013.01)

(58) Field of Classification Search
CPC ................................. G06F 3/041; G06F 3/044
See application file for complete search history.

(56) References Cited

U.S. PATENT DOCUMENTS

| | | | |
|---|---|---|---|
| 8,410,795 B1 | 4/2013 | Peng et al. | 324/658 |
| 2011/0032193 A1 | 2/2011 | Szalkowski | 345/173 |
| 2012/0127118 A1 | 5/2012 | Nolting et al. | 345/174 |
| 2012/0249476 A1* | 10/2012 | Schwartz et al. | 345/174 |
| 2012/0313880 A1* | 12/2012 | Geaghan et al. | 345/173 |

* cited by examiner

*Primary Examiner* — Michael Faragalla
(74) *Attorney, Agent, or Firm* — Harrington & Smith

(57) ABSTRACT

An apparatus including distinct capacitive sensor electrodes irregularly configured across a sensing area, wherein each capacitive sensor electrode is an island associated with a unique combination of two positional components within the sensing area; and a plurality of conductive traces each of which is operatively connected to one of the distinct capacitive sensor electrodes and wherein at least some of the conductive traces extend over the sensing area.

19 Claims, 8 Drawing Sheets

CAPACITIVE SENSOR ELECTRODES

TECHNOLOGICAL FIELD

Embodiments of the present invention relate to an apparatus. In particular, they relate to an apparatus comprising a plurality of capacitive sensor electrodes distributed over a sensing area.

BACKGROUND

Current touch sensitive displays may use a plurality of capacitive sensor electrodes distributed over a sensing area. The capacitive sensor electrodes sense a proximal conductive object such as a user's finger touching the sensing area or hovering on top of it.

BRIEF SUMMARY

According to various, but not necessarily all, embodiments of the invention there is provided an apparatus comprising: distinct capacitive sensor electrodes irregularly configured across a sensing area, wherein each capacitive sensor electrode is an island associated with a unique combination of two positional components within the sensing area; and a plurality of conductive traces each of which is operatively connected to one of the distinct capacitive sensor electrodes and wherein at least some of the conductive traces extend over the sensing area.

According to various, but not necessarily all, embodiments of the invention there is provided a method comprising: providing distinct capacitive sensor electrodes, for touch sensing over a sensing area, as an irregular configuration over the sensing area wherein each capacitive sensor electrode is an island associated with a unique combination of two positional components within the sensing area; and routing conductive traces to each of the capacitive sensor electrodes wherein at least some of the conductive traces extend over the sensing area.

According to various, but not necessarily all, embodiments of the invention there is provided an apparatus comprising: distinct capacitive sensor electrodes over a sensing area wherein each capacitive sensor electrode is an island associated with a unique combination of two positional components within the sensing area; and a plurality of conductive traces each of which is operatively connected to one of the distinct capacitive sensor electrodes, wherein at least some of the conductive traces extend over the sensing area and wherein the capacitive sensor electrodes are misaligned and comprise jagged perimeters.

BRIEF DESCRIPTION

For a better understanding of various examples of embodiments of the present invention reference will now be made by way of example only to the accompanying drawings in which.

Figure 3:
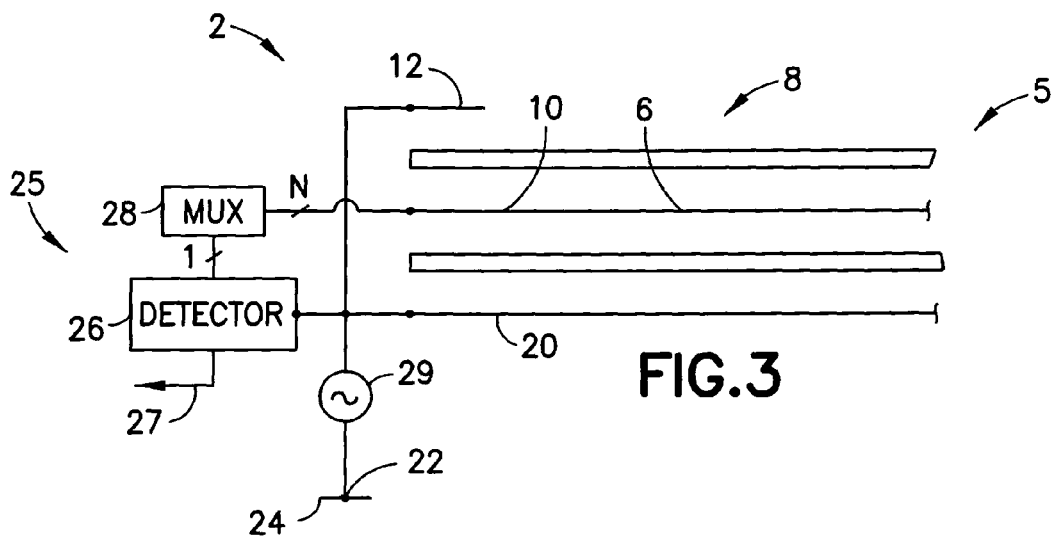
Figure 4:
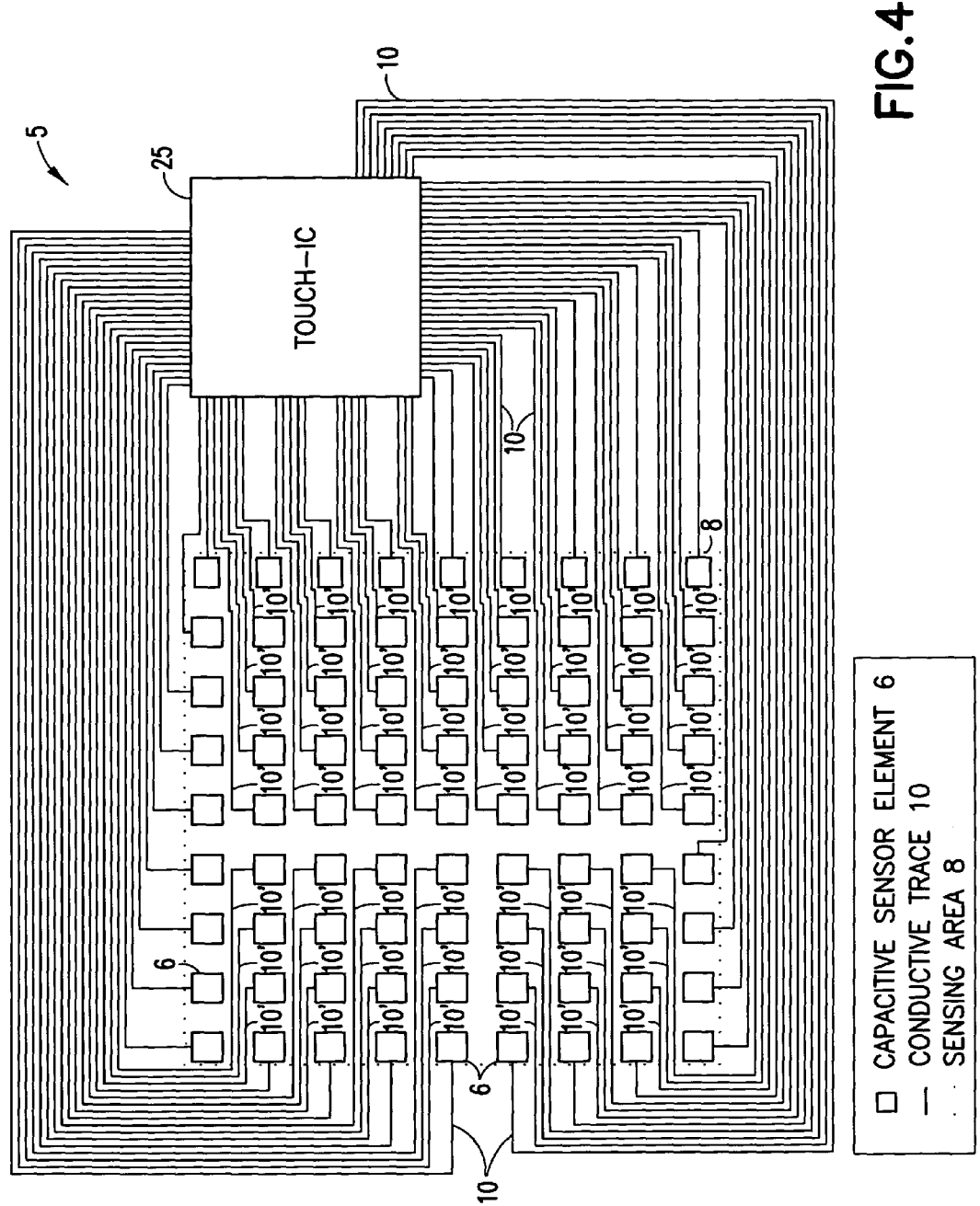
Figure 5:
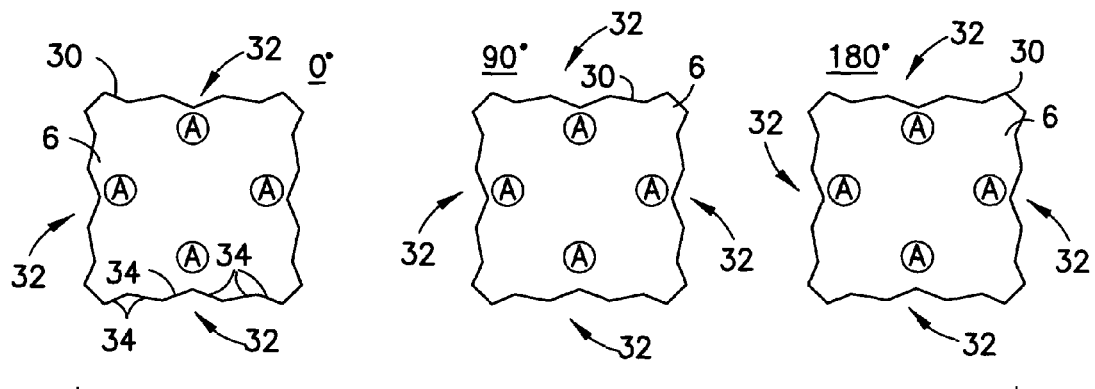
Figure 6A:
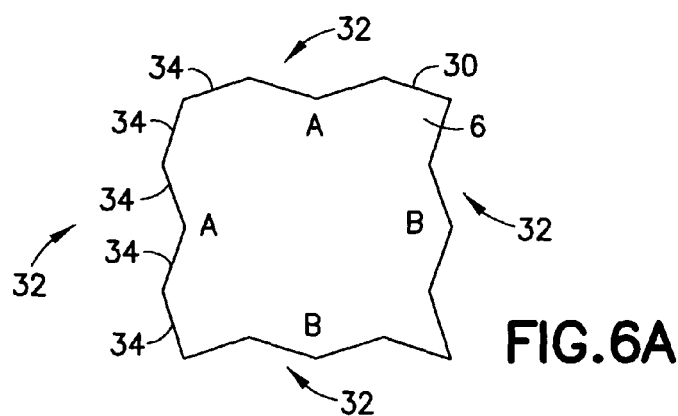
Figure 6B:
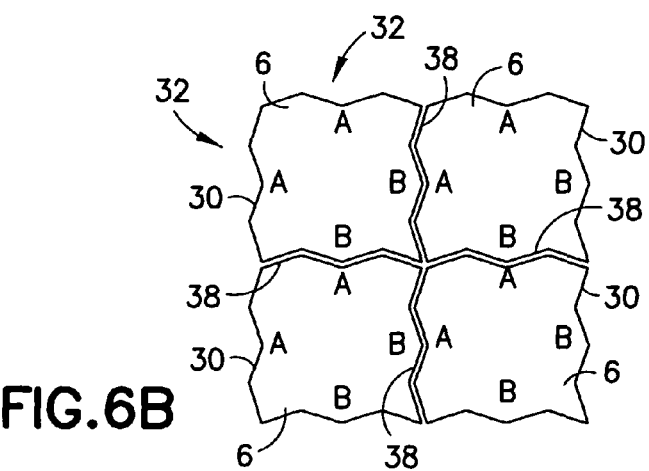
Figure 7:
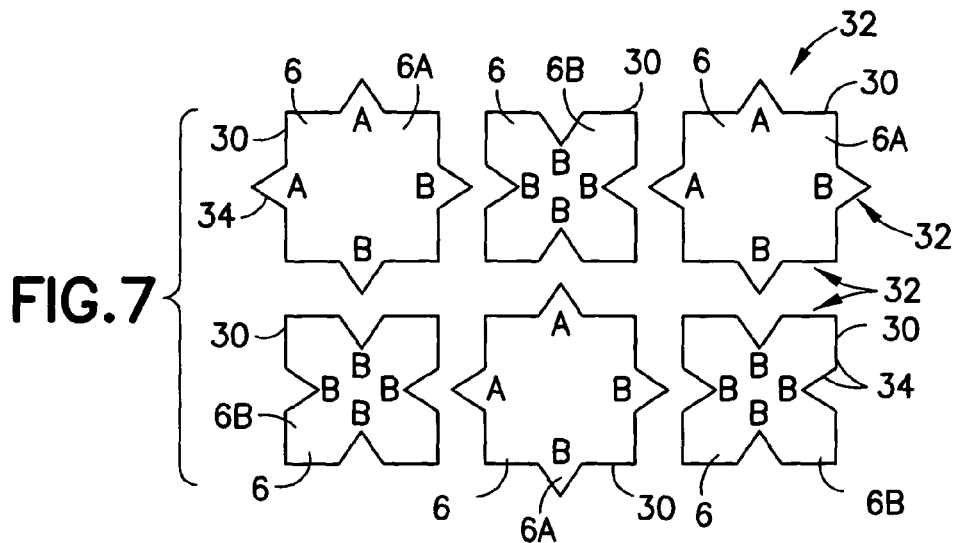
Figure 8:
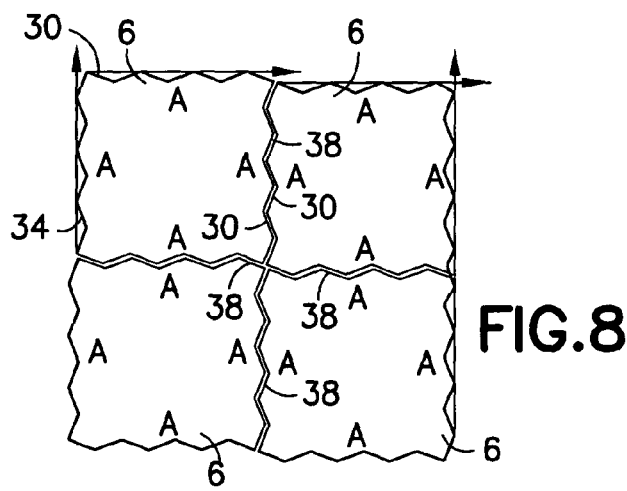
Figure 9:
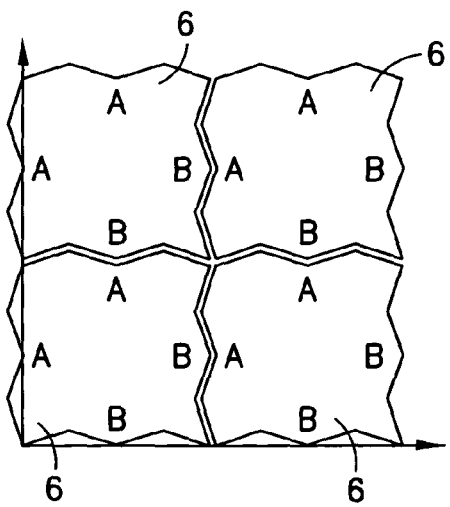
Figure 10:
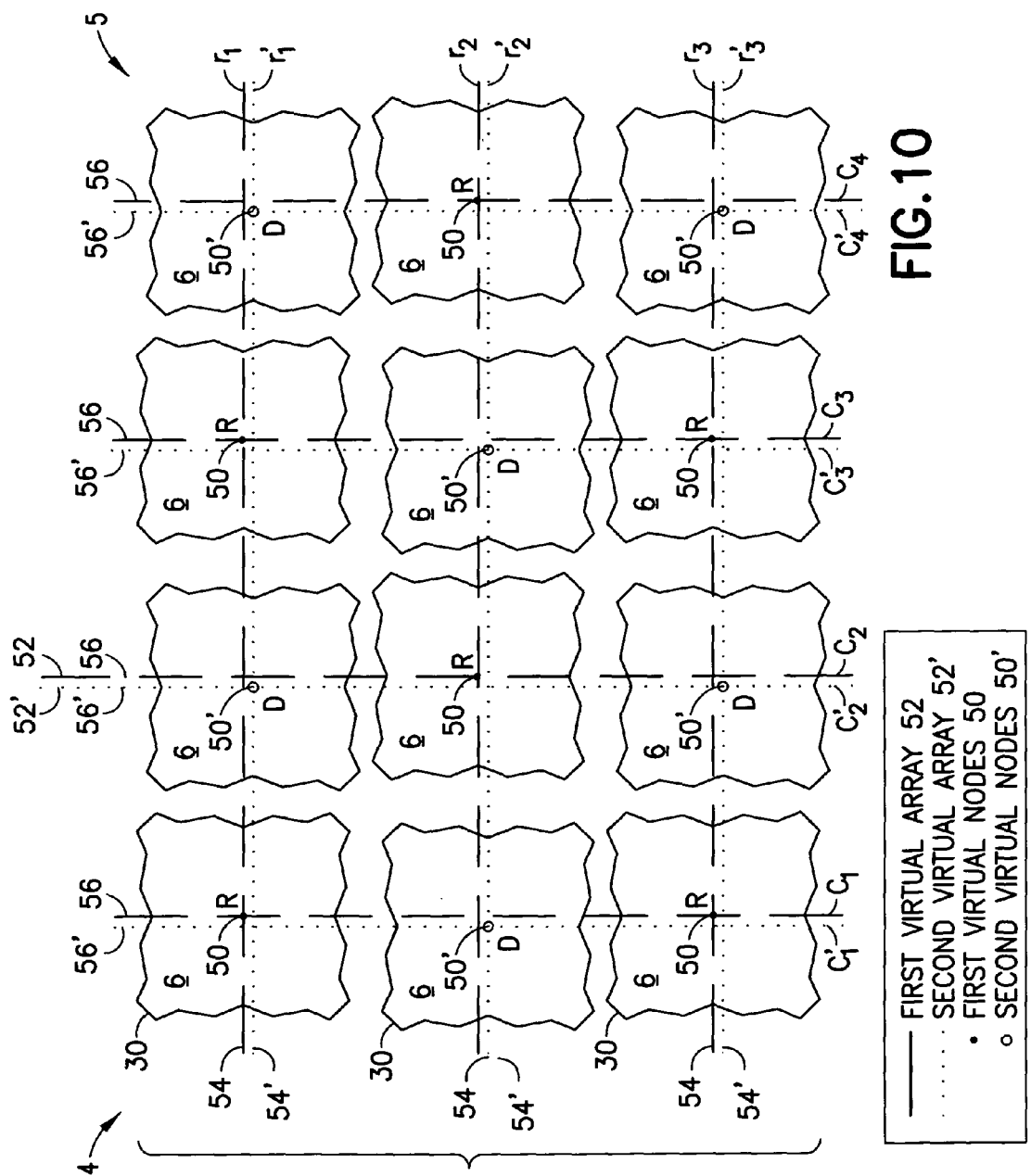
Figure 11:
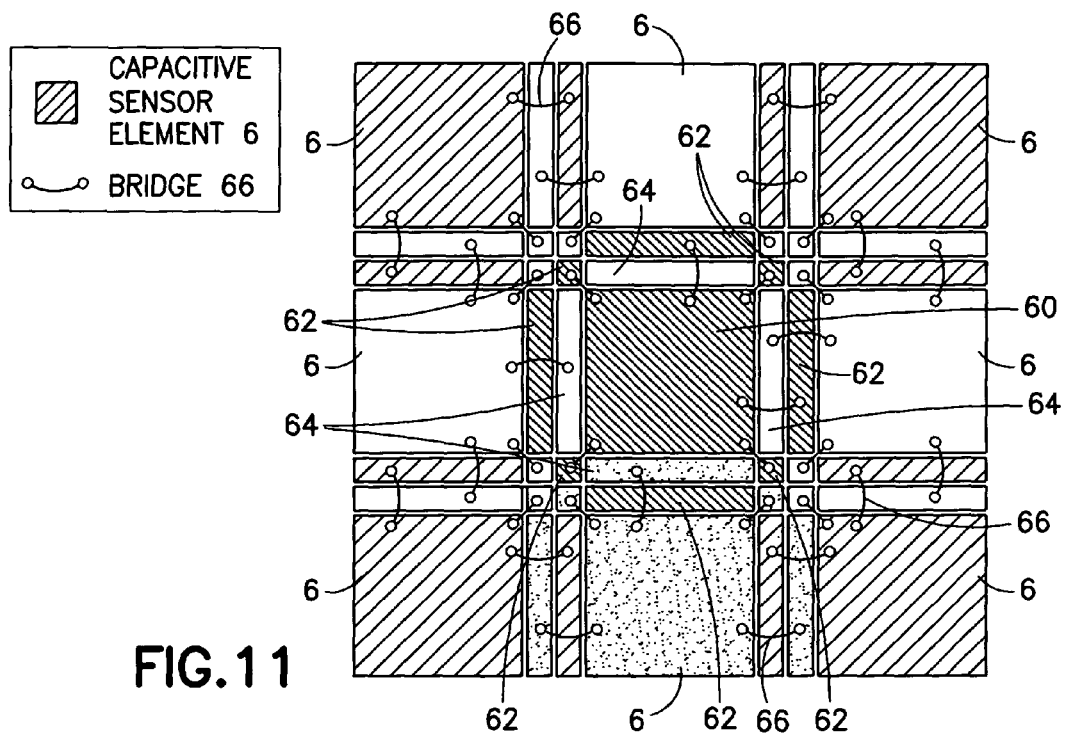
Figure 12:
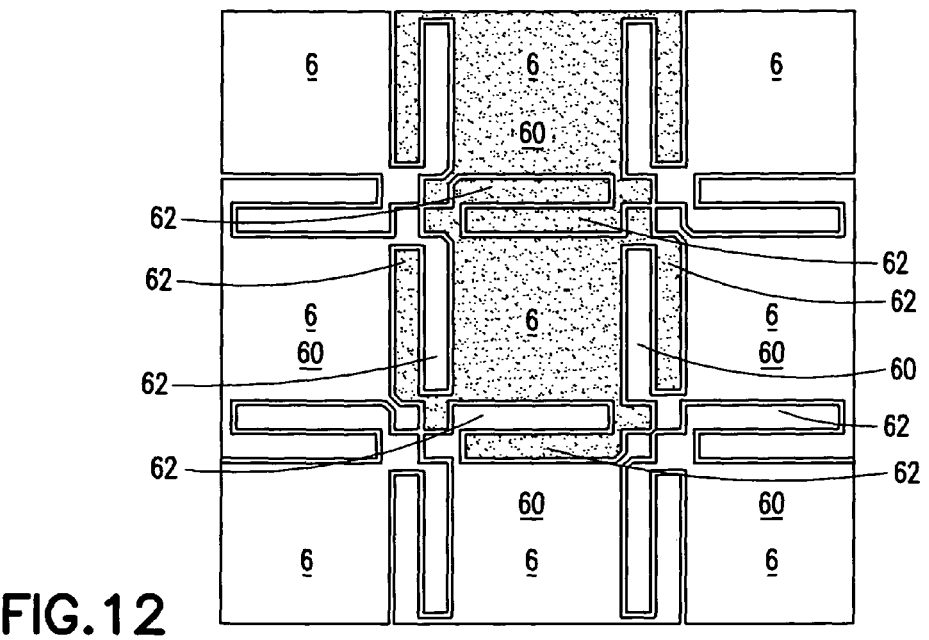
Figure 13:
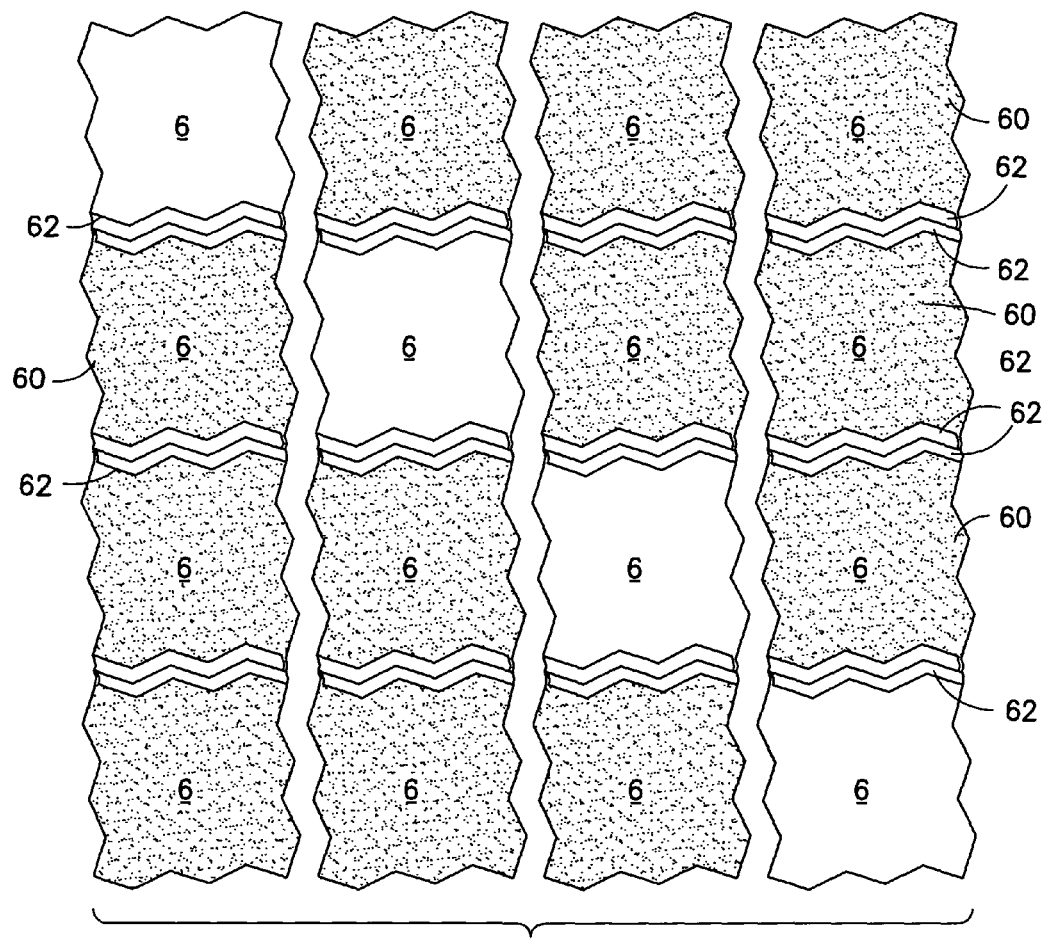
Figure 14:
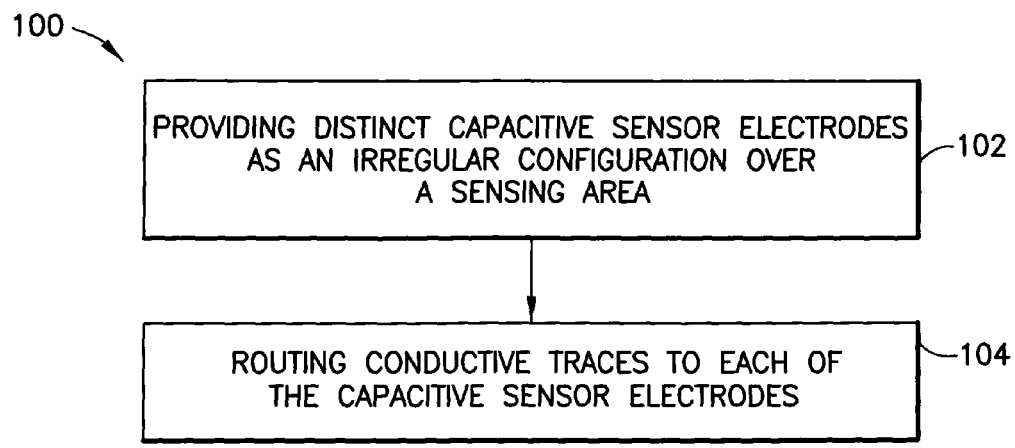
Figure 15A:
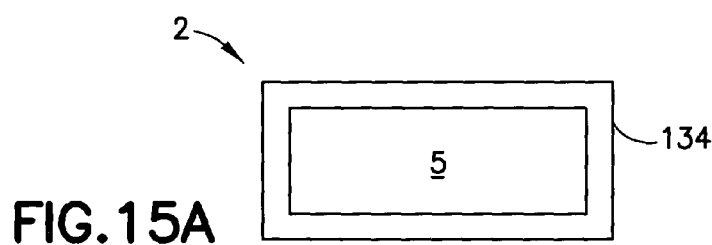
Figure 15B:
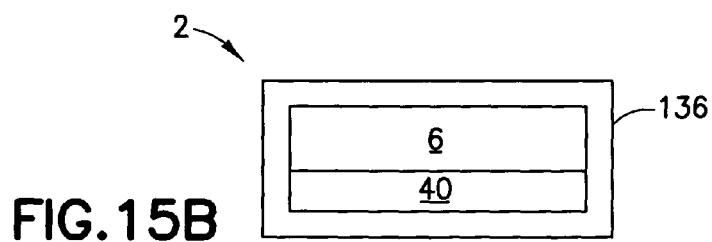

FIG. 3 schematically illustrates an example of a cross-section through a sensing arrangement;

FIG. 4 illustrates a plan view of an example of a sensing arrangement comprising distributed discrete capacitive sensing electrodes;

FIG. 5 illustrates an example in which a capacitive sensor electrode comprises an irregular perimeter;

FIG. 6A illustrates an example in which the capacitive sensor electrode comprises an irregular perimeter;

FIG. 6B illustrates tessellation, with a fixed width gaps, of the capacitive sensor electrode illustrated in FIG. 6A;

FIG. 7 illustrates a sensing arrangement comprising first capacitive sensor electrodes and second, different capacitive sensor electrodes;

FIG. 8 illustrates an example in which capacitive sensor electrodes are tessellated such that opposing adjacent irregular perimeters match to provide a fixed width gap and an off-set between end-points of the opposing adjacent irregular perimeters brings the capacitive sensor electrodes out of alignment with horizontal rows and vertical columns;

FIG. 9 illustrates an example of an array of tessellated capacitive sensor electrodes rotated by a small angle relative to the horizontal and vertical;

FIG. 10 illustrates an example of a sensing arrangement comprising an array of misaligned capacitive sensor electrodes;

FIGS. 11, 12 and 13 illustrate examples of sensing arrangements in which multi-component capacitive sensor electrodes are 'inter-meshed';

FIG. 14 illustrates a method 100;

FIG. 15A illustrates an example of a touch panel module;

FIG. 15B illustrates an example of a touch sensitive display module; and

Figure 15C:
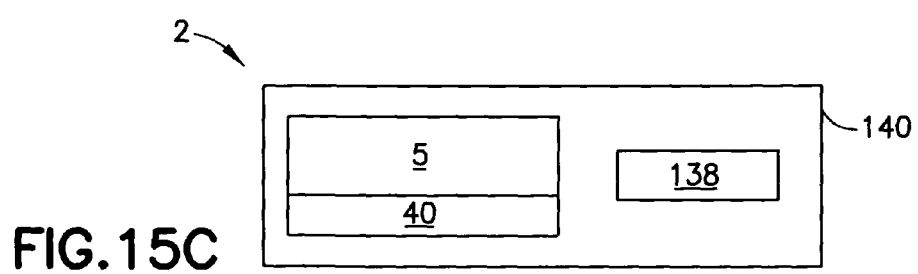

FIG. 15C illustrates an example of an electronic device.

DETAILED DESCRIPTION

The Figures illustrate an apparatus 2 comprising: distinct capacitive sensor electrodes 6 irregularly configured across a sensing area 8, wherein each capacitive sensor electrode 6 is an island associated with a unique combination of two positional components (x, y) within the sensing area 8; and a plurality of conductive traces 10 each of which is operatively connected to one of the distinct capacitive sensor electrodes 6 and wherein at least some of the conductive traces 10 extend over the sensing area 8.

Figure 1:
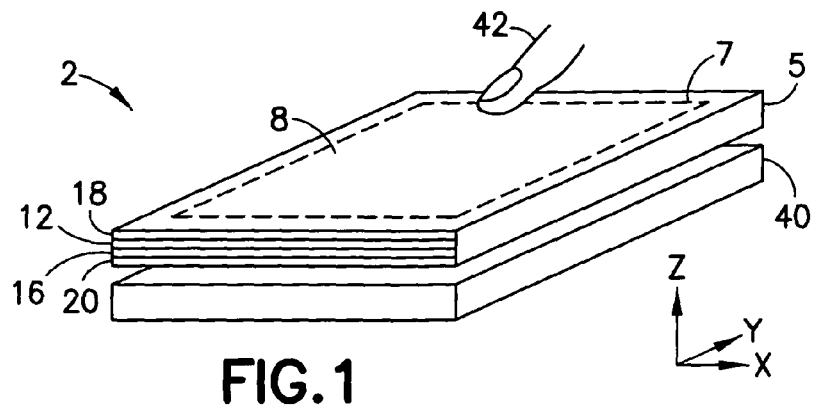
FIG. 1 illustrates an example of an apparatus comprising a sensing arrangement comprising a plurality of capacitive sensor electrodes distributed over a sensing area.

FIG. 1 illustrates an apparatus 2 comprising: a sensing arrangement 5 comprising, in a layer 16, a plurality of capacitive sensor electrodes 6 distributed over a sensing area 8 and conductive traces 10 at least partially distributed over the sensing area 8.

In this example, the apparatus 2 overlies a display 40 and operates as a capacitive touch panel for the display 40. The display 40 and the apparatus 2 in combination form a touch sensitive display configured to detect a variation in capacitance arising from proximity of a user input device 42 to one or more of the plurality of capacitive sensor electrodes 6.

The sensing arrangement 5 is configured to sense a variation in capacitance arising from proximity of a user input device 42 at or over the sensing area 8 of a touch surface 7. In this example the user input device 42 is a user's finger.

The apparatus 2 is configured to sense the (x, y) position of the user's finger within the sensing area 8 when it touches the sensing area 8 of the touch surface 7. In some examples, the apparatus 2 may additionally provide a (z) position of the user's finger when it is close to but not touching the sensing area 8 of the touch surface 7 and/or provide an (x, y) position of the user's finger when it is close to but not yet touching the sensing area 8 of the touch surface 7. The apparatus 2 may therefore provide for not only two-dimensional sensing but also three-dimensional sensing.

The apparatus 2 may optionally comprise a first shield electrode 12 overlying conductive traces 10 at least outside the sensing area 8; and a second shield electrode 20 underlying, in the sensing area 8, the conductive traces 10 and the capacitive sensor electrodes 6. The second shield electrode 20 may be a continuous uninterrupted single layer electrode that underlies the layer 16.

The apparatus 2 may optionally comprise a cover 18 overlying the capacitive sensor electrodes 6 and the plurality of conductive traces 10.

Figure 2:
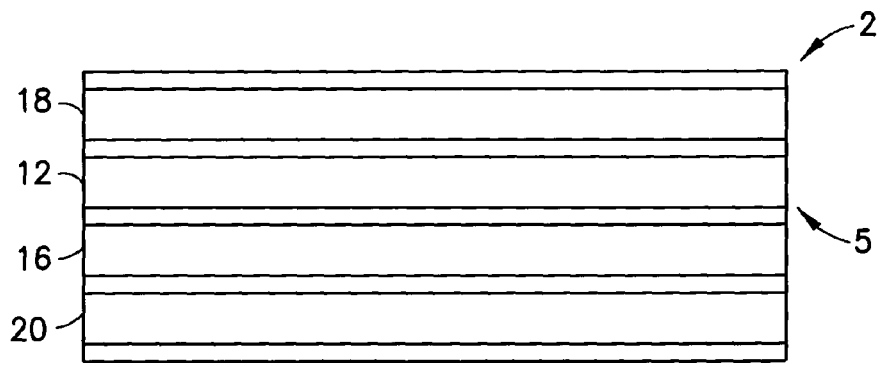
FIG. 2 illustrates an example of a sensing arrangement comprising a plurality of capacitive sensor electrodes distributed over a sensing area.

FIG. 2 illustrates an apparatus 2 that has a sensing arrangement 5 comprising, in a layer 16, a plurality of capacitive sensor electrodes 6 distributed over a sensing area 8 and conductive traces 10 at least partially distributed over the sensing area 8. The apparatus 2 also comprises a first shield electrode 12 overlying conductive traces 10 outside the sensing area 8. It also comprises a second shield electrode 20 underlying, in the sensing area 8, the conductive traces 10 and the capacitive sensor electrodes 6. In addition, it comprises a cover 18 overlying the capacitive sensor electrodes 6 and the plurality of conductive traces 10.

FIG. 4 illustrates a plan view of an example of a sensing arrangement 5. The Figure illustrates the distribution of the capacitive sensing electrodes 6 over the sensing area 8 and the associated plurality of conductive traces 10 that route signals between the capacitive sensing electrodes 6 and the integrated control circuitry 25. Each conductive traces 10 is operatively connected to one of the distinct capacitive sensor electrodes 6. Each distinct capacitive sensor electrode 6 is operatively connected to one of the conductive traces 10.

Each capacitive sensor electrode 6 is an island associated with a unique combination of two positional components (x, y) within the sensing area 8. Each capacitive sensor electrode 6 is an island because each capacitive sensor 6 has its own distinct/discrete perimeter 30 that is separated from the perimeter of any other sensor 6 and which circumscribes/surrounds a unique position (x,y).

The capacitive sensor electrodes 6 are distributed, as islands, usually in two orthogonal directions over the sensing area 8 as an array 4. The array 4 of capacitive sensor electrodes 6 is configured to sense the (x, y) position of the user's finger within the sensing area 8 when it touches the first sensing area 8 of the touch surface 7. In some examples, the array 4 of capacitive sensor electrodes 6 may additionally provide a (z) position of the user's finger when it is close to but not touching the sensing area 8 of the touch surface 7 and/or provide an (x, y) position of the user's finger when it is close to but not yet touching the first sensing area 8 of the touch surface 7.

Conductive traces 10 are operatively connected to the plurality of distinct capacitive sensor electrodes 6.

Each of the conductive traces 10 is operatively connected to one of the capacitive sensor electrodes 10. At least some of the conductive traces 10 extend over the sensing area 8.

In this example, the capacitive sensing electrodes 6 have a regular configuration. The capacitive sensor electrodes 6 are straight sided and are arranged in straight rows/columns. Perimeters of the capacitive sensor electrodes 6, while non-overlapping, are regularly configured with straight sides (they are quadrilaterals). The capacitive sensor electrodes 6 are aligned in straight, orthogonal rows and columns.

FIGS. 5 to 13, illustrate examples in which the sensing arrangement 5, for example as described in relation to FIG. 4, comprises distinct capacitive sensor electrodes 6 that are irregularly configured across a sensing area 8 rather that regularly configured as illustrated in FIG. 4. The capacitive sensor electrodes 6 are, however, still distributed, as islands, usually in two orthogonal directions over the sensing area 8 as an array 4 and consequently at least some of all of the conductive traces 10 (each of which is associated with a capacitive sensor electrode 6) extend over the sensing area 8 to their respective associated island capacitive sensor elements 6.

In FIGS. 5 to 13, the capacitive sensor electrodes 6 comprise perimeters 30.

The perimeters 30 of the capacitive sensor electrodes 6 are irregularly configured and non-overlapping. 'Irregularly' configured means that they have irregular perimeters 30, for example jagged perimeters 30, rather than regular straight sided perimeters and/or are not arranged in standard straight rows/columns.

FIG. 5 illustrates an example in which the capacitive sensor electrode 6 comprises an irregular perimeter 30. In this example the perimeter 30 is jagged.

The perimeter 30 is comprised of four different sides 32 and each side is aligned in a different orthogonal direction (0°, 90°, 180°, and 270°). Each side 32 of the perimeter 30 comprises a sequence of parts 34 at least some of which parts 34 are not aligned with the direction of the side 32.

Each side 32 of the perimeter 30 comprises a sequence of interconnected parts 34. For each side 32, the length and/or orientation of the parts 34 varies along the length of the side 32.

In the example illustrated, each side 32 has a sequence of parts 34 that are rectilinear in shape, are variable in length and are variable in orientation.

Each side 32 has the same sequence A of parts 34, such that the capacitive sensor electrode 6 has 90°, 180°, and 270° rotational symmetry.

The sequence A of parts 34 is symmetric about its centre, such that the capacitive sensor electrode 6 has reflection symmetry in the bi-sectors of the sides 32.

FIG. 6A illustrates an example in which the capacitive sensor electrode 6 comprises an irregular perimeter 30. In this example the perimeter 30 is jagged.

The perimeter 30 is comprised of four different sides 32 and each side is aligned in a different orthogonal direction (0°, 90°, 180°, and 270°). Each side 32 of the perimeter 30 comprises a sequence of parts 34 at least some of which parts 34 are not aligned with the direction of the side 32.

Each side 32 of the perimeter 30 comprises a sequence of interconnected parts 34. For each side 32, the length and/or orientation of the parts 34 varies along the length of the side 32.

In the example illustrated, each side 32 has a sequence of parts 34 that are rectilinear in shape, are variable in length and are variable in orientation.

In the example of FIG. 6A, two adjacent sides 32 have a same sequence A of parts 34 and the two other adjacent sides 32 have a same sequence B of parts 34 that is different to the sequence A of parts 34. The sequence A, moving in a clockwise direction may be described as out, in, out, in. The sequence B, moving in a clockwise direction may be described as in, out, in, out.

The capacitive sensor electrode 6 does not have rotational symmetry.

A sequence A of parts 34 on one side 32 of the perimeter 30 opposes the sequence B of parts 34 on the opposite side of the perimeter.

There is a fixed distance between the sequence A of parts to the sequence B of parts 34 across the capacitive sensor electrode 6. If those opposing sequences are linearly translated relative to each other, they substantially overlap.

When the capacitive sensor electrode 6 illustrated in FIG. 6A is tessellated as illustrated in FIG. 6B, the opposing irregular perimeters match and there is a fixed width gap 38 between the sequence A of parts 34 of the perimeter 30 for the capacitive sensor electrodes 6 and the sequence B of parts 34 of the perimeter 30 for adjacent ones of the capacitive sensor electrodes 6.

The capacitive sensor electrodes 6 each comprise a perimeter 30. In this example, each perimeter 30 comprises an upper side portion 32, a lower side portion 32, a right side portion 32 and a left side portion 32. The upper portion (sequence A) is an inversion of the lower portion (sequence B) and the left portion (sequence A) is an inversion of the right portion (sequence B) such that when the capacitive sensor electrodes are arranged as a tessellated array there is:

an upper fixed gap 38 between the upper portion and a lower portion of an adjacent capacitive sensor electrode, a lower fixed gap 38 between the lower portion and an upper portion of another adjacent capacitive sensor electrode 6, a right fixed gap 38 between the right portion and a left portion of a further adjacent capacitive sensor electrode; and a left fixed gap 38 between the left portion and a right portion of a still further adjacent capacitive sensor electrode 6.

In this embodiment each of the capacitive sensor electrodes 6 are the same shape.

In an alternative embodiment, illustrated in FIG. 7, it may be possible to have different capacitive sensor electrodes 6. For example, it may be possible to have a first set of first capacitive sensor electrodes 6A and a second set of second capacitive sensor electrodes 6B. At least some of the first capacitive sensor electrodes 6A may be positioned so that each of those first capacitive sensor electrode 6A has all its sides 32 adjacent only second capacitive sensor electrodes 6B and not first capacitive sensor electrodes 6A. At least some of the second capacitive sensor electrodes 6B may be positioned so that each of those second capacitive sensor electrodes 6B has all its sides 32 adjacent only first capacitive sensor electrodes 6A and not second capacitive sensor electrodes 6B. In the illustrated example, the first capacitive sensor electrode 6A has four sides and the second capacitive sensor electrode 6B has four sides, however, different sided first capacitive sensor electrodes 6A and second capacitive sensor electrodes 6B may be used. For example, the first capacitive sensor electrode 6A and the second capacitive sensor electrode 6B may be triangles, quadrilaterals or hexagonals. The first capacitive sensor electrodes 6A and the second capacitive sensor electrodes 6B may or may not have the same number of sides and, if they have the same number of sides, may or may not be the same shape.

The first capacitive sensor electrodes 6A each comprise a perimeter 30. Each perimeter 30 comprises an upper side portion 32, a lower side portion 32, a right side portion 32 and a left side portion 32. The side portions of the first capacitive sensor electrode each comprise a sequence A of parts 34.

The second capacitive sensor electrodes 6B each comprise a perimeter 30. Each perimeter 30 comprises an upper side portion 32, a lower side portion 32, a right side portion 32 and a left side portion 32. The side portions 32 of the second capacitive sensor electrodes 6B each comprise a sequence B of parts 34.

The sequence A is an inversion (negative) of the sequence B such that when the first capacitive sensor electrodes 6A are arranged opposing adjacent second capacitive sensor electrodes 6B the perimeters 30 match and there is a fixed gap 38 between the opposing side portions 32 of the first and second capacitive sensor electrodes 6A, 6B.

FIGS. 8, 9 and 10 illustrate that perimeters 30 of the capacitive sensor electrodes 6 may be irregularly aligned.

FIG. 8 illustrates an example in which the capacitive sensor electrode 6 comprises an irregular perimeter 30. In this example the perimeter 30 is jagged.

The perimeter 30 is comprised of four different sides 32 and each side is aligned in a different orthogonal direction (0°, 90°, 180°, and 270°). Each side 32 of the perimeter 30 comprises a sequence of parts 34 at least some of which parts 34 are not aligned with the direction of the side 32.

Each side 32 of the perimeter 30 comprises a sequence of interconnected parts 34. For each side 32, the length and/or orientation of the parts 34 varies along the length of the side 32.

In the example illustrated, each side 32 has a sequence of parts 34 that are rectilinear in shape, are variable in length and are variable in orientation.

Each side 32 has the same sequence A of parts 34, such that the capacitive sensor electrode 6 has 90°, 180°, and 270° rotational symmetry.

The sequence A of parts 34 is not symmetric about its centre, such that the capacitive sensor electrode 6 does not have reflection symmetry in the bi-sectors of the sides 32. However, the sequence A of parts 34 has 180° rotational symmetry about its centre (midpoint).

When the capacitive sensor electrode 6 is tessellated as illustrated in FIG. 8, the perimeters 30 match and there is a fixed width gap 38 between the sequence A of parts 34 of the perimeter 30 for the capacitive sensor electrodes 6 and the 180° rotated sequence A of parts 34 of the perimeter 30 for adjacent ones of the capacitive sensor electrodes 6.

In this example, the sequence A of parts 34 is configured such that the end of one side 32 is off-set in a direction orthogonal to the direction of that side 32 from the other end of the side 32. That is, if one travels along a side, from one end to the other, there will be a cumulative displacement orthogonal to the overall direction of travel. The off-set is fixed and the same for each sequence A.

When the capacitive sensor electrode 6 is tessellated as illustrated in FIG. 8, such that the opposing adjacent irregular perimeters 30 match so that there is a fixed width gap 38, the off-set brings the capacitive sensor electrodes 6 out of alignment with horizontal rows and vertical columns.

FIG. 9 illustrates an array 4 of tessellated capacitive sensor electrodes 6 as previously described with reference to FIG. 6B. Whereas in FIG. 6B, the rows of capacitive sensor electrodes 6 and the columns of capacitive sensor electrodes are aligned with the horizontal and vertical respectively, in FIG. 9, they are rotated by a small angle relative to the horizontal and vertical.

FIG. 10 illustrates an example of a sensing arrangement 5 comprising an array 4 of misaligned capacitive sensor electrodes 6.

The Figure illustrates a first virtual array 52 comprising first virtual nodes 50 positioned along first rows 54 and first columns 56. The first rows 54 and the first columns 56 are orthogonal and are illustrated using long dashes in the figure. If each of the columns, in order, is labelled $c_n$ where n=1, 2, 3 ... and each of the rows, in order, is labelled $r_m$ where m=1, 2, 3 ..., then a first group of capacitive sensor electrodes (R) are positioned (centred) at the first virtual nodes 50 defined by $(c_a, r_b)$ where when a is odd, b is odd and where when a is even, b is even. There are no capacitive sensor electrodes (R) of the first group positioned (centred) at the first virtual nodes 50 defined by $(c_a, r_b)$ where a is odd, b is even and where a is even, b is odd.

The Figure illustrates a second virtual array 52' comprising second virtual nodes 50' positioned along second rows 54' and second columns 56'. The second rows 54' and the second columns 56' are orthogonal and are illustrated using short dashes in the figure. If each of the columns, in order, is labelled $c'_{n'}$ where n'=1, 2, 3 . . . and each of the rows, in order, is labelled where m'=1, 2, 3 . . . , then a second group of capacitive sensor electrodes (D) are positioned at the second virtual nodes 50' defined by $(c'_{a'}, r'_{b'})$ where when a' is odd, b' is even and where a' is even, b' is odd. There are no capacitive sensor electrodes (D) of the second group positioned (centred) at the second virtual nodes 50' defined by $(c'_{a'}, r'_{b'})$ where a' is odd, b is odd and where a' is even, b' is even.

The first virtual array 52 and the second virtual array 52' are overlapping and partially off-set.

In the illustrated example, the first virtual array 52 is shifted to the right only (i.e. in a direction parallel to a first row 54), such that the first group of capacitive sensor electrodes (R) are positioned with a right off-set compared to the second group of capacitive sensor electrodes (D).

In the illustrated example, the second virtual array 52' is shifted down only (i.e. in a direction parallel to a second column 56'), such that the second group of capacitive sensor electrodes (D) are positioned with a down off-set compared to the first group of capacitive sensor electrodes (R).

The perimeters 30 of the first group of capacitive sensor electrodes (R) and the perimeters 30 of the second group of capacitive sensor electrodes (D) are misaligned.

In the illustrated example, the first rows 54 are orthogonal to the first columns 56, the second rows 54' are orthogonal to the second columns 56', the first rows 54 are parallel to the second rows 54' and the first columns are parallel to the second columns 56'. The perimeters 30 of the first group of capacitive sensor electrodes (R) and the perimeters of the second group of capacitive sensor electrodes (D) are misaligned in a co-ordinate frame defined by the rows and columns.

In other embodiments, the first rows 54 may be at a small angle relative to the second rows 54'.

In the example of FIG. 10, the first virtual array 52 has an off-set, in the co-ordinate frame of the rows and columns of (0, +d) and the second virtual array 52' has an off-set, in the co-ordinate frame of the rows and columns of (−d, 0).

In other embodiments, additional virtual arrays, having capacitive sensor electrodes 6 at particular nodes of the virtual array but not other nodes, may be provided with, for example, off-sets of (0, 0) and (−d, d). The rows of the virtual arrays may be parallel and the columns of the virtual arrays may be parallel.

The periodicity with which capacitive sensor electrodes occupy nodes of the virtual array depends on the number N of virtual arrays used. In FIG. 10, N=2 and the periodicity is 2 (every second node of each virtual array is occupied in each row/column). If N=4, the periodicity is 4 and every fourth node of each virtual array is occupied).

FIGS. 11, 12 and 13 illustrate examples of sensing arrangements 5 in which an array of capacitive sensor electrodes 6 are 'inter-meshed'.

The capacitive sensor electrodes 6 are multi-component and comprise at least a first component 60 and one or more second components 62.

The first component 60 and the second component(s) 62 of the multi-component capacitive sensor electrode 6 are operatively connected and at least partially physically separated by a gap 64. In the Figures, this gap 64 is partially occupied by a second component 62 of an adjacent multi-component capacitive sensor electrode 6 such that the multi-component capacitive sensor electrodes 6 approach closely but do not touch.

The second components 62 of the multi-component capacitive sensor electrodes 6 are positioned between a first component 60 and a second component 62 of an adjacent multi-component capacitive sensor electrode 6.

In FIG. 11, for each of the multi-component capacitive sensor electrodes 6, the first component 60 and second component(s) 62 are electrically interconnected via a bridge component 66.

In FIGS. 12 and 13, for each of the multi-component capacitive sensor electrodes 6, the first component 60 and second component(s) 62 are integrated portions formed from the same continuous layer of material.

Referring back to FIGS. 1 and 2, the first shield electrode 12 may be used to cover the conductive traces 10 where they group, outside the sensing area 8, at the edges. The first shield electrode 12 may be used to cover areas that lie outside or inside the sensing area 8.

The capacitive sensor electrodes 6 and the second shield electrode 20 overlie, in this example, a display 40. As they overlie a display 40 they are preferably transparent.

The first shield electrode 12 and the capacitive sensor electrodes 6 and the second shield electrode 20 may be formed from conductive and transparent material. They may be formed from the same or similar material or mixtures of material. Examples of suitable conductive and transparent materials include, for example, Indium-Tin-Oxide (ITO), metal mesh, silver nanowires and carbon nanotube composite.

In the above examples, the array 4 of capacitive sensor electrodes 6 is arranged as a regular array that is an N row by M column regular array, with common fixed spacing between columns and common fixed spacing between rows. However, it should be appreciated that the arrays 4 of capacitive sensor electrodes 6 need not be regular arrays and may be any suitable distribution of capacitive sensor electrodes 6.

In the above examples, the array 4 of capacitive sensor electrodes 6 is arranged as NM distinct capacitive sensors 6 each of which is at an unique position (x,y) and each of which is operatively connected to a conductive trace 10. There is, in this example, common fixed spacing between the distinct, non-overlapping capacitive sensor electrodes 6 in the column direction and the row direction. In addition, in this example, the array 4 of capacitive sensor electrodes 6 occupy a single layer 16. although it can be distributed to two or more layers.

FIG. 3 schematically illustrates a cross-section through the sensing arrangement 5 along a line corresponding to a capacitive sensor electrode 6.

In this example, control circuitry 25 comprises a node 22, reference voltage circuitry 24, detection circuitry 26, multiplexer 28, and drive circuitry 29.

When the apparatus 2 is operational the node 22 is held at a constant potential such as, for example, ground potential. Circuitry 24 is configured to provide a reference voltage signal to the node 22. The circuitry 24 could be a simple galvanic connection to ground provided by, for example, a housing, a ground plane or a chassis.

The first shield electrode 12 is operatively connected to a node 22. Operatively connected means that there is a signal path but they may or may not be directly physically connected.

In this example, a second shield electrode 20 is present. It is also operatively connected to the node 22.

Detection circuitry 26 is operatively connected between the first shield electrode 12 and the array 4 of capacitive sensor electrodes 6.

A multiplexer 28 is operatively connected between the detection circuitry 26 and the array 4 of capacitive sensor electrodes 6. The multiplexer 28 is configured to isolate, for detection, each of the plurality of capacitive sensor electrodes 6 of the array 4.

Drive circuitry 29 is configured to provide an alternating voltage to the first shield electrode 12 and, if present, the second shield electrode 20.

The drive circuitry 29 is configured to provide simultaneously a time varying electric field at each of the capacitive sensor electrodes 6.

The detection circuitry 26 is configured to detect a variation in capacitance arising from proximity of a user input device 42 to one or more of the plurality of capacitive sensor electrodes 6. The detection circuitry 26 may comprise a low-impedance charge amplifier.

When the user's hand, or some other grounded user input device 42, is brought to the vicinity of the sensing area 8 of the apparatus 2, a capacitive current flows from the first shield electrode 12 through the detection circuitry 26 to one or more capacitive sensor electrodes 6. The charge amplifier in the detection circuitry 26 registers a charge displacement due to the current. The output of the charge amplifier is synchronously rectified and integrated, after which it is passed to an analog-to-digital converter and then provided as digital output 27 for processing in the digital domain.

The drive voltage and the drive frequency typically range from 1 V to 10 V and from 10 to 200 kHz, respectively.

Due to reasons of cost and size, a single charge amplifier and a single analog-to-digital converter may be used in the detection circuitry 26 for multiple capacitive sensor electrodes 6 and a multiplexer 28 may be used to isolate for sensing each capacitive sensor electrode 6 separately.

FIG. 14 illustrates a method 100 comprising: at block 102, providing distinct capacitive sensor electrodes 6, for touch sensing over a sensing area 8, as an irregular configuration over the sensing area 8; and, at block 104, routing conductive traces 10 to each of the capacitive sensor electrodes 6.

The capacitive sensor electrodes 6 may comprise perimeters 30.

The perimeters 30 may be irregularly configured and non-overlapping.

For example, the capacitive sensor electrodes 6 may comprise irregular perimeters 30 such as, for example, jagged perimeters 30.

The capacitive sensor electrodes 30 comprise 90 degree rotational symmetry (FIG. 5) or may not comprise 90 degree rotational symmetry (FIGS. 6A and 6B).

The perimeters of the capacitive sensor electrodes may be irregularly aligned (FIGS. 8 and 9).

The capacitive sensor electrodes 6 may be misaligned and comprise jagged perimeters (FIG. 10).

FIG. 15A illustrates the apparatus 2 embodied as a touch panel module 134 that comprises the sensing arrangement 5. The apparatus 2 is operable as a functional sensing arrangement 5 and, with additional components, as a functional display. The touch panel module 134 may be used in combination with a display 40 to form a touch screen display.

FIG. 15B illustrates the apparatus 2 embodied as a touch panel module 136 that comprises the sensing arrangement 5 and a display 40. The apparatus 2 is operable as a functional sensing arrangement 5 and as a functional display.

FIG. 15C illustrates the apparatus 2 embodied as an electronic device 140 that at least comprises the sensing arrangement 5 and a display 40. The apparatus 2 is operable as a functional display 40 and a functional sensing arrangement 5. The electronic device 140 may, for example, additionally comprise a processor 138 that processes the output 27 of the detection circuitry 26.

As used here 'module' refers to a unit or apparatus that excludes certain parts/components that would be added by an end manufacturer or a user.

In this document reference to an area refers to a two-dimensional space defined by a plane of the x and y components of a touch input position. Reference to an area overlapping another area refers to an intersection of volumes produced by projecting the areas normal to that plane. If areas are overlapping the projected volumes intersect and if the areas do not overlap the projected volumes do not intersect. Reference to an area overlapping another area does not necessarily imply an ordering to layers or components, which may be described explicitly.

Operatively connected means connected in a manner that enables the required functionality (operation). Any number or combination of intervening elements can exist (including no intervening elements) between two items that are operatively connected.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   distinct capacitive sensor electrodes irregularly configured across a sensing area, wherein each capacitive sensor electrode is an island associated with a unique combination of two positional components within the sensing area; and
   a plurality of conductive traces each of which is operatively connected to one of the distinct capacitive sensor electrodes and wherein at least some of the conductive traces extend over the sensing area;
   wherein the capacitive sensor electrodes comprise perimeters comprising an upper portion, a lower portion, a right portion and a left portion and wherein the upper portion is an inversion of the lower portion and the left portion is an inversion of the right portion such that when the capacitive sensor electrodes are arranged as an array there is:
   an upper fixed gap between the upper portion and a lower portion of an adjacent capacitive sensor electrode;
   a lower fixed gap between the lower portion and an upper portion of another adjacent capacitive sensor electrode;
   a right fixed gap between the right portion and a left portion of a further adjacent capacitive sensor electrode; and
   a left fixed gap between the left portion and a right portion of another adjacent capacitive sensor electrode.

2. An apparatus as claimed in claim 1, wherein the capacitive sensor electrodes comprise perimeters and wherein the perimeters of the capacitive sensor electrodes are irregularly configured and non-overlapping.

3. An apparatus as claimed in claim 1, wherein the capacitive sensor electrodes comprise irregular perimeters.

4. An apparatus as claimed in claim 3, wherein the irregular perimeters of the capacitive sensor electrodes are jagged perimeters.

5. An apparatus as claimed in claim 1, wherein the capacitive sensor electrodes comprise 90 degree rotational symmetry.

6. An apparatus as claimed in claim 1, wherein the capacitive sensor electrodes comprise perimeters and wherein each portion of the perimeter of a first capacitive sensor electrode is a fixed distance from a corresponding portion of the perimeter of a second capacitive sensor electrode adjacent the first capacitive sensor electrode.

7. An apparatus as claimed in claim 1, wherein the capacitive sensor electrodes comprise a first set of capacitive sensor electrodes and a second set of capacitive sensor electrodes positioned between capacitive sensors of the first set, wherein the capacitive sensor electrodes of the first set comprise perimeters that match adjacent perimeters of the adjacent capacitive sensor electrodes of the second set but do not match the perimeters of the capacitive sensor electrodes of the first set.

8. An apparatus as claimed in claim 1, wherein the capacitive sensor electrodes comprise perimeters and wherein the perimeters of the capacitive sensor electrodes are irregularly aligned.

9. An apparatus as claimed in claim 8, wherein the capacitive sensor electrodes are irregularly aligned via matching of opposing adjacent irregular perimeters of adjacent capacitive sensor electrodes to provide a fixed gap between said opposing adjacent irregular perimeters.

10. An apparatus as claimed in claim 9, wherein opposing adjacent irregular perimeters have end points and a midpoint half way between the end points, and each opposing adjacent irregular perimeter has 180 degree rotation symmetry about its midpoint and an off-set between its end points.

11. An apparatus as claimed in claim 1, wherein the capacitive sensor electrodes comprises:
a first group of capacitive sensor electrodes positioned at first virtual nodes defined by a first virtual array comprising first virtual nodes positioned along first rows and first columns; and
a second group of different capacitive sensor electrodes positioned at second virtual nodes defined by a second virtual array comprising second virtual nodes positioned along second rows and second columns, overlapping and partially off-set from the first virtual array.

12. An apparatus as claimed in claim 11, wherein the off-set comprises a component parallel to the first rows and a component parallel to the second rows.

13. An apparatus as claimed in claim 1, wherein at least some of the capacitive sensor electrodes are multi-component and comprise:
at least a first component and a second component, wherein the first component and the second component are operatively connected and at least partially physically separated by a gap.

14. An apparatus as claimed in claim 13, where the second components of the multi-component capacitive sensor electrodes are positioned between the first and second components of an adjacent multi-component capacitive sensor electrode.

15. A method comprising:
providing distinct capacitive sensor electrodes, for touch sensing over a sensing area, as an irregular configuration over the sensing area wherein each capacitive sensor electrode is an island associated with a unique combination of two positional components within the sensing area; and
routing conductive traces to each of the capacitive sensor electrodes wherein at least some of the conductive traces extend over the sensing area;
wherein the capacitive sensor electrodes comprise perimeters comprising an upper portion, a lower portion, a right portion and a left portion and wherein the upper portion is an inversion of the lower portion and the left portion is an inversion of the right portion such that when the capacitive sensor electrodes are arranged as an array there is:
an upper fixed gap between the upper portion and a lower portion of an adjacent capacitive sensor electrode;
a lower fixed gap between the lower portion and an upper portion of another adjacent capacitive sensor electrode;
a right fixed gap between the right portion and a left portion of a further adjacent capacitive sensor electrode; and
a left fixed gap between the left portion and a right portion of another adjacent capacitive sensor electrode.

16. A method as claimed in claim 15, wherein the capacitive sensor electrodes comprise perimeters and wherein the perimeters of the capacitive sensor electrodes are irregularly configured and non-overlapping.

17. A method as claimed in claim 16, wherein the capacitive sensor electrodes comprise irregular perimeters.

18. A method as claimed in claim 17, wherein the irregular perimeters of the capacitive sensor electrodes are jagged perimeters.

19. An apparatus comprising:
distinct capacitive sensor electrodes over a sensing area wherein each capacitive sensor electrode is an island associated with a unique combination of two positional components within the sensing area; and
a plurality of conductive traces each of which is operatively connected to one of the distinct capacitive sensor electrodes, wherein at least some of the conductive traces extend over the sensing area and wherein the capacitive sensor electrodes are misaligned and comprise jagged perimeters;
wherein the capacitive sensor electrodes comprise perimeters comprising an upper portion, a lower portion, a right portion and a left portion and wherein the upper portion is an inversion of the lower portion and the left portion is an inversion of the right portion such that when the capacitive sensor electrodes are arranged as an array there is:
an upper fixed gap between the upper portion and a lower portion of an adjacent capacitive sensor electrode;
a lower fixed gap between the lower portion and an upper portion of another adjacent capacitive sensor electrode;
a right fixed gap between the right portion and a left portion of a further adjacent capacitive sensor electrode; and
a left fixed gap between the left portion and a right portion of another adjacent capacitive sensor electrode.

\* \* \* \* \*